Oct. 24, 1939.  G. A. F. WINCKLER  2,177,235
MULTIPLE CELL GENERATOR WITH SINGLE ELECTROLYTE
Filed Oct. 29, 1934  2 Sheets-Sheet 1
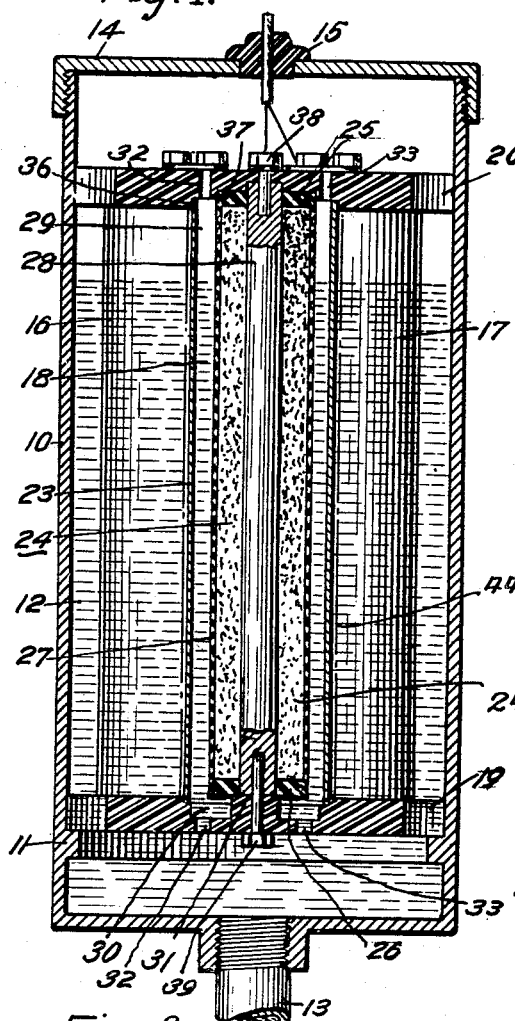
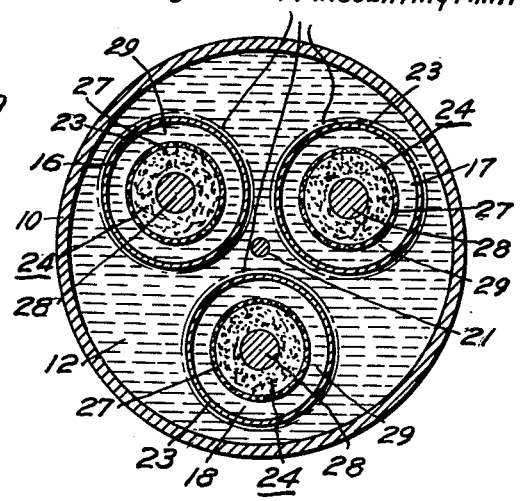
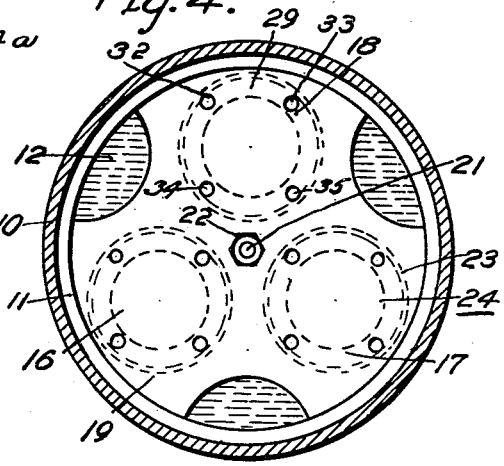
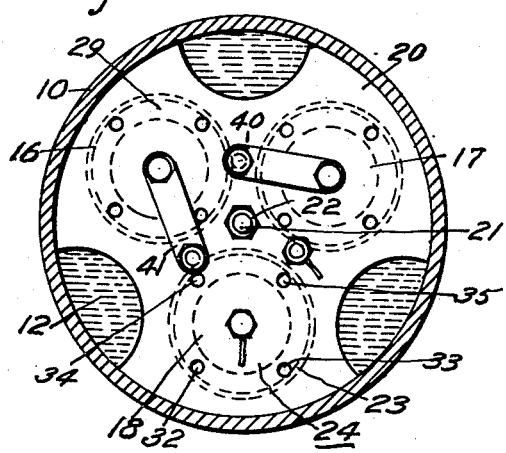
Inventor,
Gunnar A. F. Winckler,
by Frank G. Hattie,
Attorney.

Oct. 24, 1939.  G. A. F. WINCKLER  2,177,235
MULTIPLE CELL GENERATOR WITH SINGLE ELECTROLYTE
Filed Oct. 29, 1934  2 Sheets-Sheet 2

Inventor,
Gunnar A. F. Winckler,
by Frank G. Hattie,
Attorney.

Patented Oct. 24, 1939

2,177,235

UNITED STATES PATENT OFFICE 2,177,235

MULTIPLE CELL GENERATOR WITH SINGLE ELECTROLYTE

Gunnar A. F. Winckler, Worcester, Mass., assignor to Winckler Engineering Laboratories Incorporated, Boston, Mass., a corporation of Massachusetts Application October 29, 1934, Serial No. 750,523

1 Claim. (Cl. 136—102)

My invention relates to a plurality of electric generating cells employing an electrolyte common to all the cells for increasing the voltage in an electric circuit, of which the following is a specification.

My invention requires the association of a positive and negative pole concentric with each other, this arrangement being such that when the electrodes are immersed in electrolytic fluid the various cells will be mutually shielded from each other, and, properly connected, the voltage of the several cells will build up. Heretofore this building up action has not been accomplished due to the fact that an electrolyte common to a plurality of cells has never been used in conjunction with cells having proper shielding so that direct electrolytic action can take place within the generator to increase the voltage. It has been found, however, that proper electrolytic action takes place between concentric negative and positive poles when the action is confined locally within the cells. When this action thus takes place separately in each generator, proper shielding is obtained to increase the voltage in proportion to the number of cells used. The shielded structure is one embodiment of the invention.

An object of the invention is to increase the voltage in an electrical circuit by using a plurality of shielded cells using an electrolyte common to all the cells. A further object is to make a cheap cell structure in which the voltages of the several cells can be additively combined, particularly when it is desired to use waters of the salt seas as the electrolyte.

Referring to the figures:

Fig. 1 is a cross-section of a multiple generating unit showing how the cells are shielded to increase the voltage.

Fig. 2 is a cross-section through the unit.

Fig. 3 is a plan view of the cells and their connection with the outer casing in section.

Fig. 4 is a bottom plan view of the support for the cells and the hole through which the electrolyte enters the cells.

Figure 5:
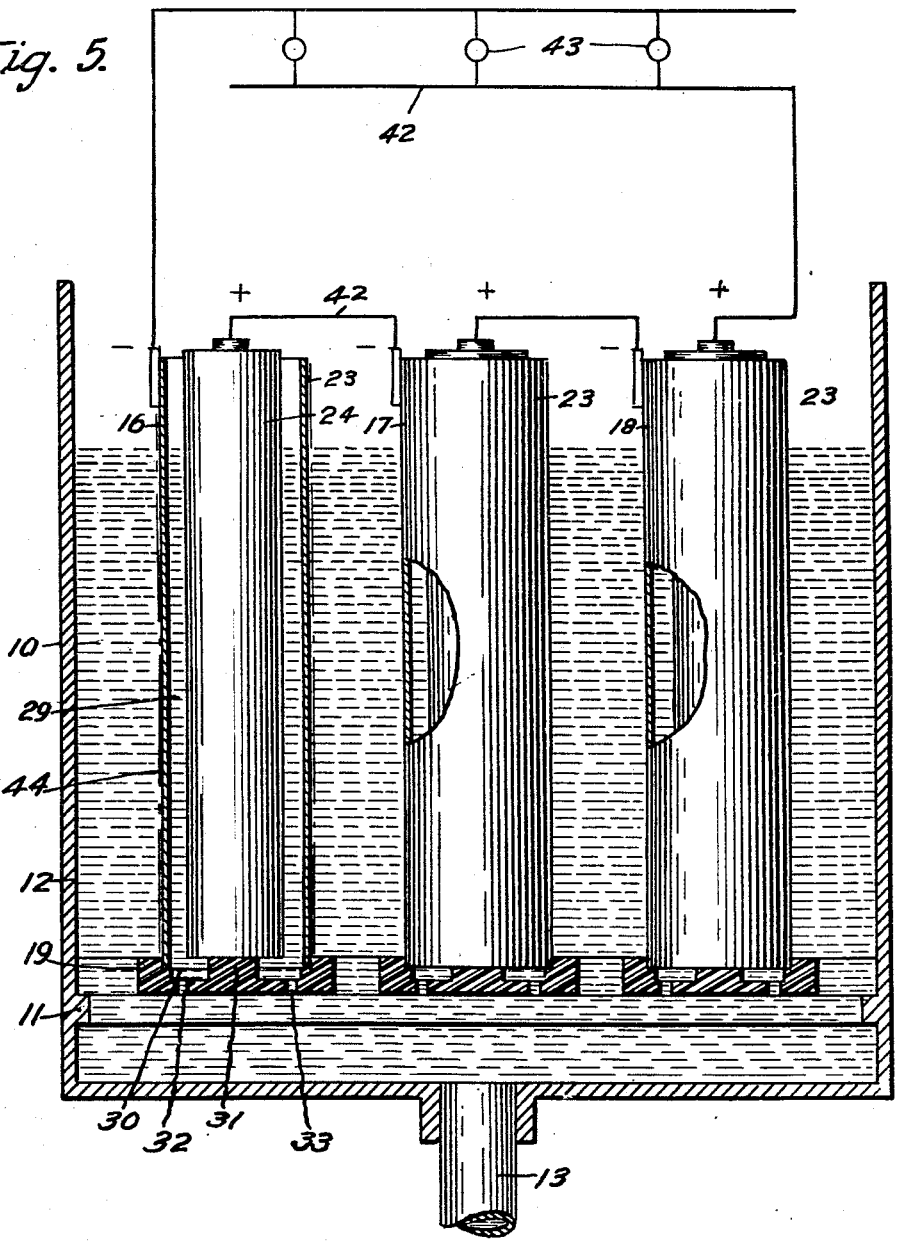
Fig. 5 is a diagram of connections and an exploded view of the cells located in the electrolyte.

Referring to the drawings which illustrate the new system of increasing the voltage in an electrical circuit by using a plurality of electric generating cells employing an electrolyte common thereto, it will be seen that the cells are mounted in a container 10 which is provided with an annular ledge 11 for supporting the cells. The container 10 is provided with a supply of electrolyte 12 which enters through the pipe 13 from any suitable source. The operation of the cells does not depend on the container, but the latter is used to build up a certain size or unit to increase the utility of the invention. The container is provided with a cover 14 to safeguard the cells and to support the insulating bushing 15 through which the electrical current wires pass to the lamps or other load. There are three cells 16, 17, and 18, supported as a unit on the base plate 19 and head plate 20, which plates are held in place by the rod 21 and are secured rigidly in position by means such as the nuts 22, thereby making a unit cell structure. The plates 19 and 20 are formed of any suitable hard insulating material. The cells are identical in construction so that a description of one will be sufficient.

Each cell is provided with a zinc casing 23 which serves as a negative pole of the generator. Inwardly concentric with the negative pole 23 is a positive pole 24 composed of a carbon rod 28 having discs 25 and 26 rigidly secured thereto and made of insulating material and which rod is surrounded by granular carbon particles 24a. Formed in the edges of the discs are V-shaped grooves adapted to receive the edges of the cloth holder 27 for the ground carbon. The edges of the cloth sink into the grooves and are tied with string which holds it in position. This structure provides of a super-active positive pole for the generator and provides a free space 29 between the positive and negative poles to allow the electrolytic fluid to immerse both poles.

Formed in the base plate 19 are two annular grooves 30 having a central projection 31 which supports the positive pole at its lower end. Formed in the base plate 19 are three sets of four holes each 32, 33, 34, and 35 through which the electrolytic fluid enters the generators to immerse the positive and negative poles.

Formed in the head plate 20 are two concentric annular depressions 36 and 37 adapted to receive the positive pole construction. Holes are shown as drilled in both plates and in the carbon rod, into which holes the bolts 38 and 39 may be threaded to hold the generator rigidly in position.

The cells are connected in series by the contact plates 40 and 41. The positive pole 24 and the negative pole 23 are connected into the electrical circuit 42 to supply energy and light the lamps or other load 43.

The outside of the negative pole casing 23 is coated with insulating paint or other material 44 to eliminate electrical load leaks between the cells.

In operation a plurality of cells 16, 17, and 18 are connected to an electrical circuit 42 for lighting the lamps or other load 43. The invention resides primarily in increasing the voltage in the lamp circuit 42 in proportion to the number of cells used in relation to a single electrolyte. The cells are supported a suitable distance apart in a single electrolyte. The electrolytic action takes place between the negative and positive poles in each of the generators and is connected into the electrical circuit 42 to the lamp. Since the negative pole shields the positive pole in each generator, a maximum voltage is set up in each generator, so that the voltage in the line is increased in proportion to the number of cells used, thereby increasing the voltage obtainable from a plurality of cells employing an electrolyte common to them all.

What I claim as new and desire to secure by Letters Patent of the United States is:

A multi-cell electro-chemical generator employing a single common electrolyte, in which generator the available output voltage is substantially the summation of the voltage of the separate cells, an outer casing containing the electrolyte, a base plate within the casing supported in spaced relation from the lower end thereof, a plurality of cells externally connected in series mounted on said base plate, each cell comprising an inner electrode consisting of a carbon rod and a sack of ground carbon particles disposed about the rod, and an outer electrode of dissimilar conductive material from the inner electrode spaced from and surrounding the same, the outer electrode having an external insulating coating shielding it from the adjacent cells by rendering the outer surface electrically inactive, the said base plate having restricted openings therein for ingress of the electrolyte into the inter-electrode space in each cell, a head plate in said casing overlying said cells, means for securing said head plate to said bottom plate to form a unitary cell assembly, and a bushing in said outer casing for the passage of electrical leads from the generator.

GUNNAR A. F. WINCKLER.